United States Patent
Duan et al.

(10) Patent No.: US 7,392,186 B2
(45) Date of Patent: Jun. 24, 2008

(54) SYSTEM AND METHOD FOR EFFECTIVELY IMPLEMENTING AN OPTIMIZED LANGUAGE MODEL FOR SPEECH RECOGNITION

(75) Inventors: Lei Duan, San Jose, CA (US); Gustavo Abrego, San Jose, CA (US); Xavier Menendez-Pidal, Los Gatos, CA (US); Lex Olorenshaw, Half Moon Bay, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 860 days.

(21) Appl. No.: 10/812,561

(22) Filed: Mar. 30, 2004

(65) Prior Publication Data

US 2005/0228667 A1 Oct. 13, 2005

(51) Int. Cl.
*G10L 15/00* (2006.01)
*G10L 15/04* (2006.01)
(52) U.S. Cl. .................................. 704/243; 704/251
(58) Field of Classification Search ................ 704/243
See application file for complete search history.

(56) References Cited

U.S. PATENT DOCUMENTS

| | | | | |
|---|---|---|---|---|
| 6,151,575 A * | 11/2000 | Newman et al. | ............ | 704/260 |
| 6,157,912 A | 12/2000 | Kneser et al. | ................ | 704/270 |
| 6,418,431 B1 * | 7/2002 | Mahajan et al. | ................ | 707/4 |
| 6,778,952 B2 * | 8/2004 | Bellegarda | ..................... | 704/9 |
| 7,275,029 B1 * | 9/2007 | Gao et al. | ...................... | 704/9 |
| 2004/0199385 A1 * | 10/2004 | Deligne et al. | .............. | 704/235 |

* cited by examiner

*Primary Examiner*—David R. Hudspeth
*Assistant Examiner*—Josiah Hernandez
(74) *Attorney, Agent, or Firm*—Gregory J. Koerner; Redwood Patent Law

(57) ABSTRACT

A system and method for effectively implementing an optimized language model for speech recognition includes initial language models each created by combining source models according to selectable interpolation coefficients that define proportional relationships for combining the source models. A rescoring module iteratively utilizes the initial language models to process input development data for calculating word-error rates that each correspond to a different one of the initial language models. An optimized language model is then selected from the initial language models by identifying an optimal word-error rate from among the foregoing word-error rates. The speech recognizer may then utilize the optimized language model for effectively performing various speech recognition procedures.

45 Claims, 8 Drawing Sheets

Fig. 4      410

SYSTEM AND METHOD FOR EFFECTIVELY IMPLEMENTING AN OPTIMIZED LANGUAGE MODEL FOR SPEECH RECOGNITION

BACKGROUND SECTION

1. Field of Invention

This invention relates generally to electronic speech recognition systems, and relates more particularly to a system and method for effectively implementing an optimized language model for speech recognition.

2. Description of the Background Art

Implementing robust and effective techniques for system users to interface with electronic devices is a significant consideration of system designers and manufacturers. Voice-controlled operation of electronic devices may often provide a desirable interface for system users to control and interact with electronic devices. For example, voice-controlled operation of an electronic device could allow a user to perform other tasks simultaneously, or may be advantageous in certain types of operating environments. In addition, hands-free operation of electronic devices may also be desirable for users who have physical limitations or other special requirements.

Hands-free operation of electronic devices can be implemented in various types of speech-activated electronic devices. Speech-activated electronic devices advantageously allow users to interface with electronic devices in situations where it would be inconvenient or potentially hazardous to utilize a traditional input device. However, effectively implementing such speech recognition systems creates substantial challenges for system designers.

For example, enhanced demands for increased system functionality and performance typically require more system processing power and require additional hardware resources. An increase in processing or hardware requirements typically results in a corresponding detrimental economic impact due to increased production costs and operational inefficiencies.

Furthermore, enhanced system capability to perform various advanced operations provides additional benefits to a system user, but may also place increased demands on the control and management of various system components. Therefore, for at least the foregoing reasons, implementing a robust and effective method for a system user to interface with electronic devices through speech recognition remains a significant consideration of system designers and manufacturers.

SUMMARY

In accordance with the present invention, a system and method are disclosed herein for effectively implementing an optimized language model for speech recognition. In one embodiment, a current lambda value (λ) is initially set equal to zero. Then, a current language model is created by performing an interpolation procedure with the foregoing current lambda value and selected source models according to the following formula:

$$LM = \lambda SM_1 + (1-\lambda) SM_2$$

where "LM" is the current language model, "$SM_1$" is a first source model, "$SM_2$" is a second source model, "λ" is a first interpolation coefficient, and "(1−λ)" is a second interpolation coefficient. The invention is discussed here in the context of combining two source models to produce an optimized language model. However, in alternate embodiments, the present invention may be similarly practiced with any desired number of source models.

Next, a speech recognizer rescores an N-best list of recognition candidates after utilizing the current language model to perform a recognition procedure upon pre-defined input development data corresponding to the N-best list. A word-error rate corresponding to the current language model is calculated by comparing a known correct transcription of the pre-defined input development data and a top recognition candidate from the foregoing N-best list.

The current lambda value is then incremented by a pre-defined amount to produce a new current lambda value. If the new current lambda value is not greater than one, the foregoing process returns to iteratively generate new current language models, rescore the N-best list, and calculate new current word-error rates corresponding to each of the new current language models. However, if the new current lambda value is greater than one, then an optimized language model is selected corresponding to the lowest word-error rate from the foregoing iterative optimization procedure.

In accordance with the present invention, the speech recognizer may then effectively utilize the optimized language model for accurately performing various speech recognition procedures. For at least the foregoing reasons, the present invention provides an improved system and method for effectively implementing an optimized language model for speech recognition

DETAILED DESCRIPTION

The present invention relates to an improvement in speech recognition systems. The following description is presented to enable one of ordinary skill in the art to make and use the invention, and is provided in the context of a patent application and its requirements. Various modifications to the embodiments disclosed herein will be apparent to those skilled in the art, and the generic principles herein may be applied to other embodiments. Thus, the present invention is not intended to be limited to the embodiments shown, but is to be accorded the widest scope consistent with the principles and features described herein.

The present invention comprises a system and method for effectively implementing an optimized language model for speech recognition, and includes initial language models that are each created by combining source models according to selectable interpolation coefficients that define proportional relationships for combining the source models. A speech recognizer iteratively utilizes the initial language models to process input development data for calculating word-error rates that each correspond to a different one of the initial language models. An optimized language model is then selected from the initial language models by identifying an optimal word-error rate from among the foregoing word-error rates. The speech recognizer may then utilize the optimized language model for effectively performing various speech recognition procedures.

Figure 1:
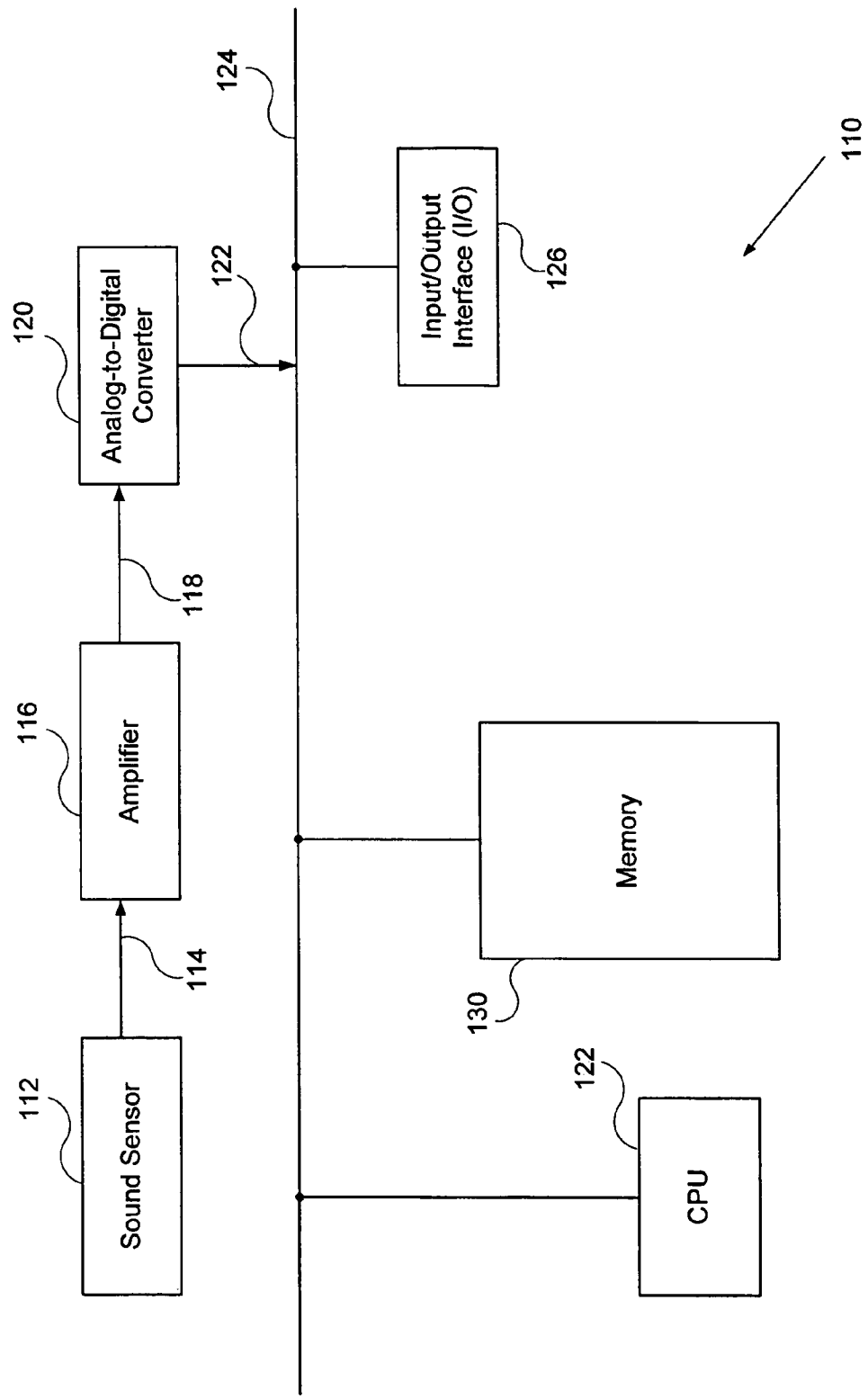
FIG. 1 is a block diagram for one embodiment of an electronic device, in accordance with the present invention.

Referring now to FIG. 1, a block diagram for one embodiment of an electronic device 110 is shown, according to the present invention. The FIG. 1 embodiment includes, but is not limited to, a sound sensor 112, an amplifier 116, an analog-to-digital converter 120, a central processing unit (CPU) 122, a memory 130, and an input/output interface (I/O) 126. In alternate embodiments, electronic device 110 may readily include various other elements or functionalities in addition to, or instead of, those elements or functionalities discussed in conjunction with the FIG. 1 embodiment.

In the FIG. 1 embodiment, sound sensor 112 detects sound energy from spoken speech, and then converts the detected sound energy into an analog speech signal that is provided via path 114 to amplifier 116. Amplifier 116 amplifies the received analog speech signal, and provides the amplified analog speech signal to analog-to-digital converter 120 via path 118. Analog-to-digital converter 120 then converts the amplified analog speech signal into corresponding digital speech data, and then provides the digital speech data via path 122 to system bus 124.

CPU 122 may access the digital speech data from system bus 124, and may responsively analyze and process the digital speech data to perform speech recognition procedures according to software instructions contained in memory 130. The operation of CPU 122 and the software instructions in memory 130 are further discussed below in conjunction with FIGS. 2-4. After the speech data has been processed, CPU 122 may then provide the results of the speech recognition procedure to other devices (not shown) via input/output interface 126. In alternate embodiments, the present invention may readily be embodied in various electronic devices and systems other than the electronic device 110 shown in FIG. 1. For example, the present invention may be implemented as part of entertainment robots such as AIBO™ and QRIO™ by Sony Corporation.

Figure 2:
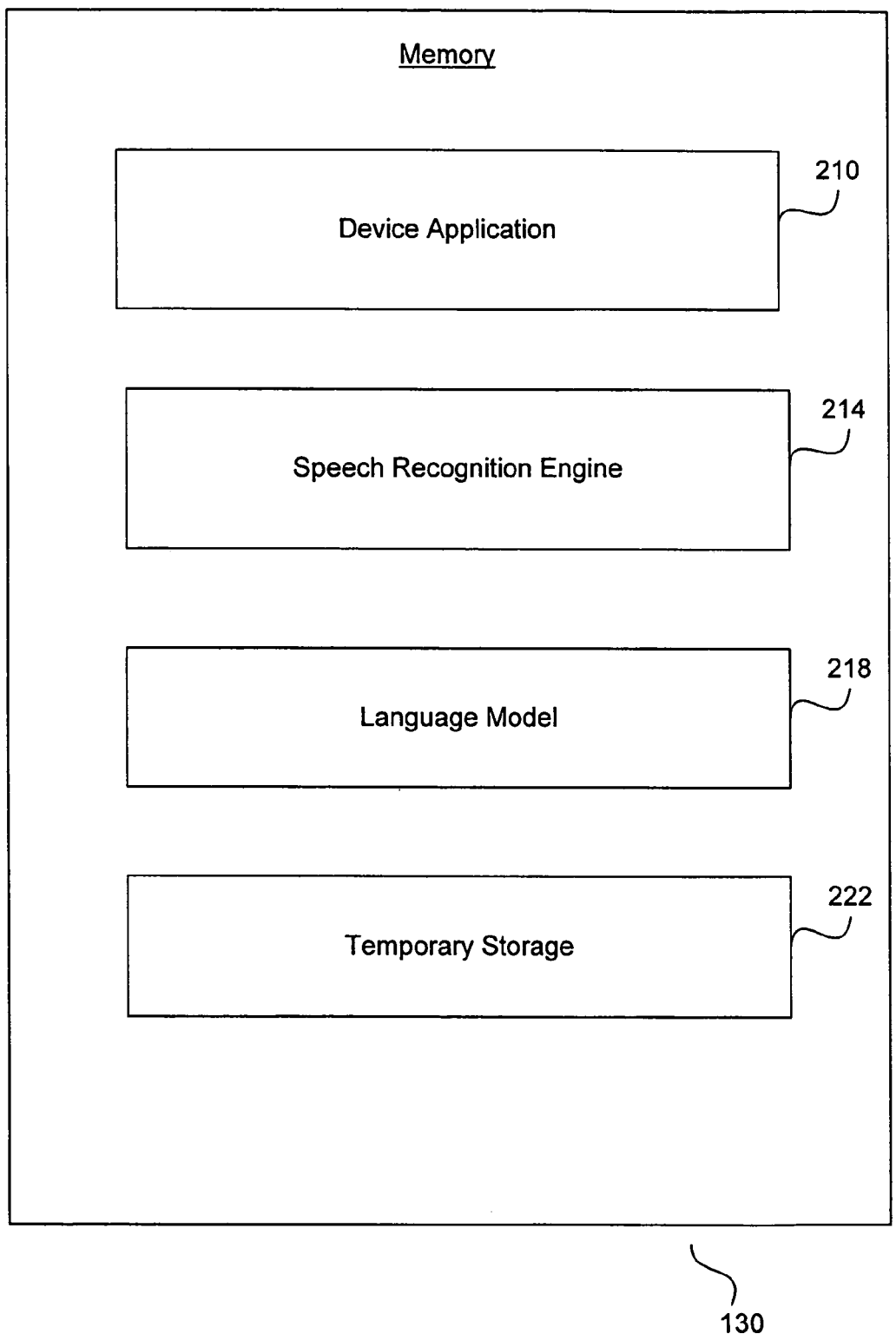
FIG. 2 is a block diagram for one embodiment of the memory of FIG. 1, in accordance with the present invention.

Referring now to FIG. 2, a block diagram for one embodiment of the FIG. 1 memory 130 is shown, according to the present invention. Memory 130 may comprise any desired storage-device configurations, including, but not limited to, random access memory (RAM), read-only memory (ROM), and storage devices such as floppy discs or hard disc drives. In the FIG. 2 embodiment, memory 130 includes a device application 210, speech recognition engine 214, a language model 218, and temporary storage 222. In alternate embodiments, memory 130 may readily include various other elements or functionalities in addition to, or instead of, those elements or functionalities discussed in conjunction with the FIG. 2 embodiment.

In the FIG. 2 embodiment, device application 210 includes program instructions that are preferably executed by CPU 122 (FIG. 1) to perform various functions and operations for electronic device 110. The particular nature and functionality of device application 210 typically varies depending upon factors such as the type and particular use of the corresponding electronic device 110.

In the FIG. 2 embodiment, speech recognition engine 214 includes one or more software modules that are executed by CPU 122 to analyze and recognize input sound data. Certain embodiments of speech recognition engine 214 are further discussed below in conjunction with FIGS. 3-5. In the FIG. 2 embodiment, speech recognition engine 214 utilizes language model 218 for performing various speech recognition procedures. Electronic device 110 may utilize temporary storage 222 for storing any desired type of information, software programs, or data. The utilization and effective implementation of language model 218 are further discussed below in conjunction with FIGS. 3-8.

Figure 3:
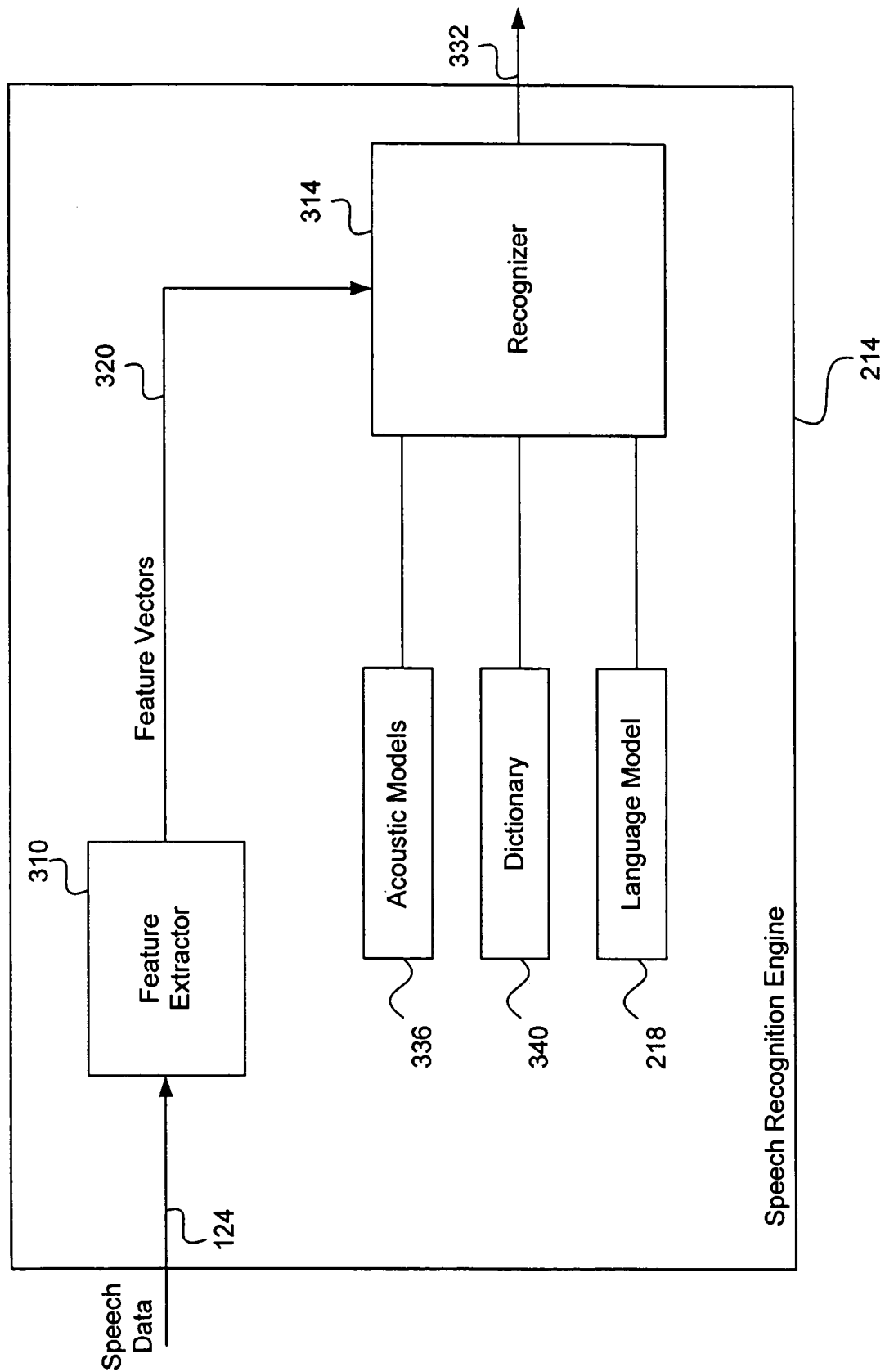
FIG. 3 is a block diagram for one embodiment of the speech recognition engine of FIG. 2, in accordance with the present invention.

Referring now to FIG. 3, a block diagram for one embodiment of the FIG. 2 speech recognition engine 214 is shown, in accordance with the present invention. Speech recognition engine 214 includes, but is not limited to, a language model 218a feature extractor 310, a recognizer 314, acoustic models 336, and dictionary 340. In alternate embodiments, speech recognition engine 210 may readily include various other elements or functionalities in addition to, or instead of, those elements or functionalities discussed in conjunction with the FIG. 3 embodiment.

In the FIG. 3 embodiment, a sound sensor 112 (FIG. 1) provides digital speech data to feature extractor 310 via system bus 124. Feature extractor 310 responsively generates corresponding representative feature vectors, which are provided to recognizer 314 via path 320. In the FIG. 3 embodiment, recognizer 314 is configured to recognize words in a predetermined vocabulary that is represented in dictionary 340. The foregoing vocabulary in dictionary 340 corresponds to any desired commands, instructions, narration, or other sounds that are supported for speech recognition by speech recognition engine 214.

In practice, each word from dictionary 340 is associated with a corresponding phone string (string of individual phones) which represents the pronunciation of that word. Acoustic models 336 (such as Hidden Markov Models) for each of the phones are selected and combined to create the foregoing phone strings for accurately representing pronunciations of words in dictionary 340. Recognizer 314 compares input feature vectors from line 320 with the entries (phone strings) from dictionary 340 to determine which word produces the highest recognition score. The word corresponding to the highest recognition score may thus be identified as the recognized word.

Speech recognition engine 214 also utilizes a language model 218 to determine specific recognized word sequences that are supported by speech recognition engine 214. Recognized sequences of vocabulary words may then be output as the foregoing word sequences from recognizer 314 via path 332. The operation and implementation of recognizer 314 and language model 218 are further discussed below in conjunction with FIGS. 4-8.

Figure 4:
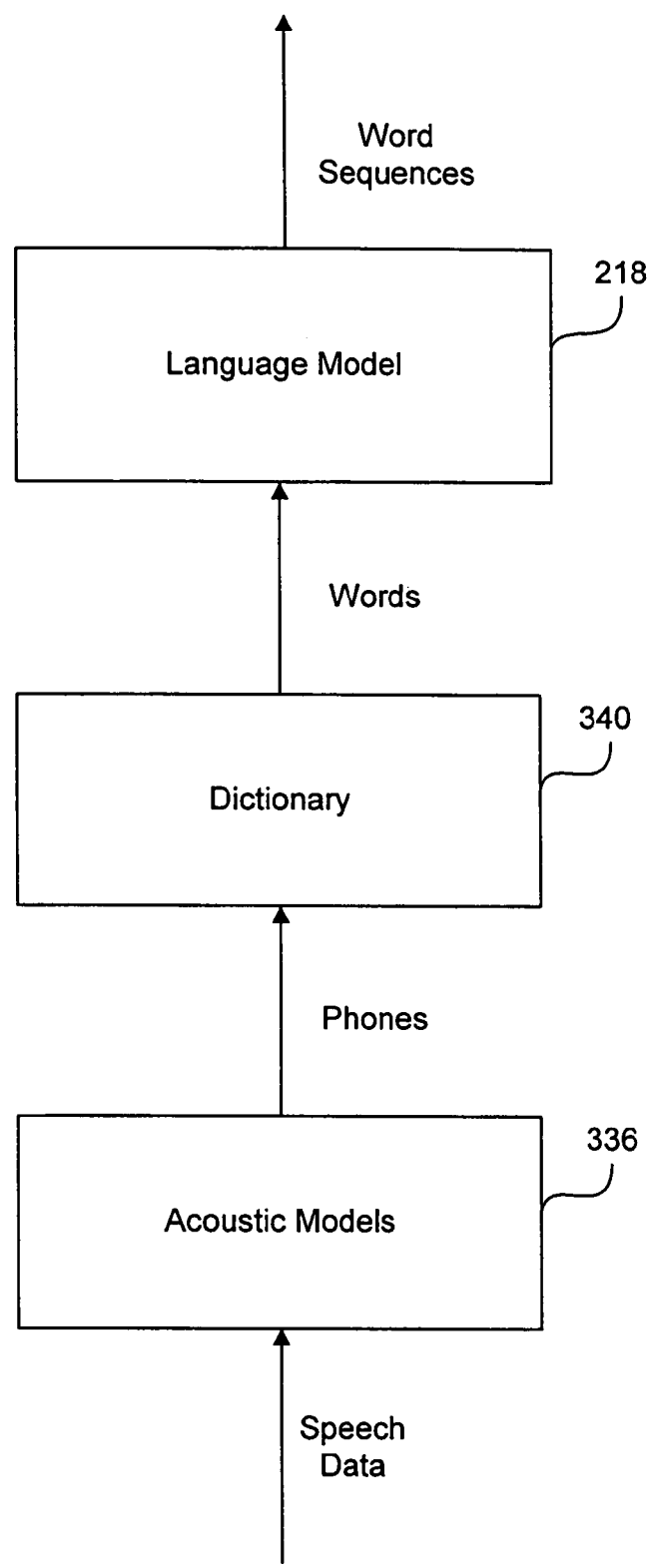
FIG. 4 is a block diagram illustrating functionality of the speech recognition engine of FIG. 3, in accordance with one embodiment of the present invention.

Referring now to FIG. 4, a block diagram illustrating functionality of the FIG. 3 speech recognition engine 214 is shown, in accordance with one embodiment of the present invention. In alternate embodiments, the present invention may readily perform speech recognition procedures using various techniques or functionalities in addition to, or instead of, those techniques or functionalities discussed in conjunction with the FIG. 4 embodiment.

In the FIG. 4 embodiment, speech recognition engine 214 (FIG. 3) initially receives speech data from a sound sensor 112, as discussed above in conjunction with FIG. 3. A recognizer 314 (FIG. 3) from speech recognition engine 214 then compares the input speech data with acoustic models 336 to identify a series of phones (phone strings) that represent the input speech data. Recognizer 340 next references dictionary 340 to look up recognized vocabulary words that correspond to the identified phone strings. Finally, recognizer 340 refers to language model 218 to form the recognized vocabulary words into word sequences, such as sentences, phrases, or commands that are supported by speech recognition engine 214.

In certain embodiments, recognizer 340 may output different word sequences as recognition candidates corresponding to given input speech data. Recognizer 340 may assign recognition scores to each of the recognition candidates, and may then rank the recognition candidates in an N-best list according to their respective recognition scores. The utilization of an N-best list in implementing an optimized language model 218 is further discussed below in conjunction with FIGS. 7 and 8.

Figure 5:
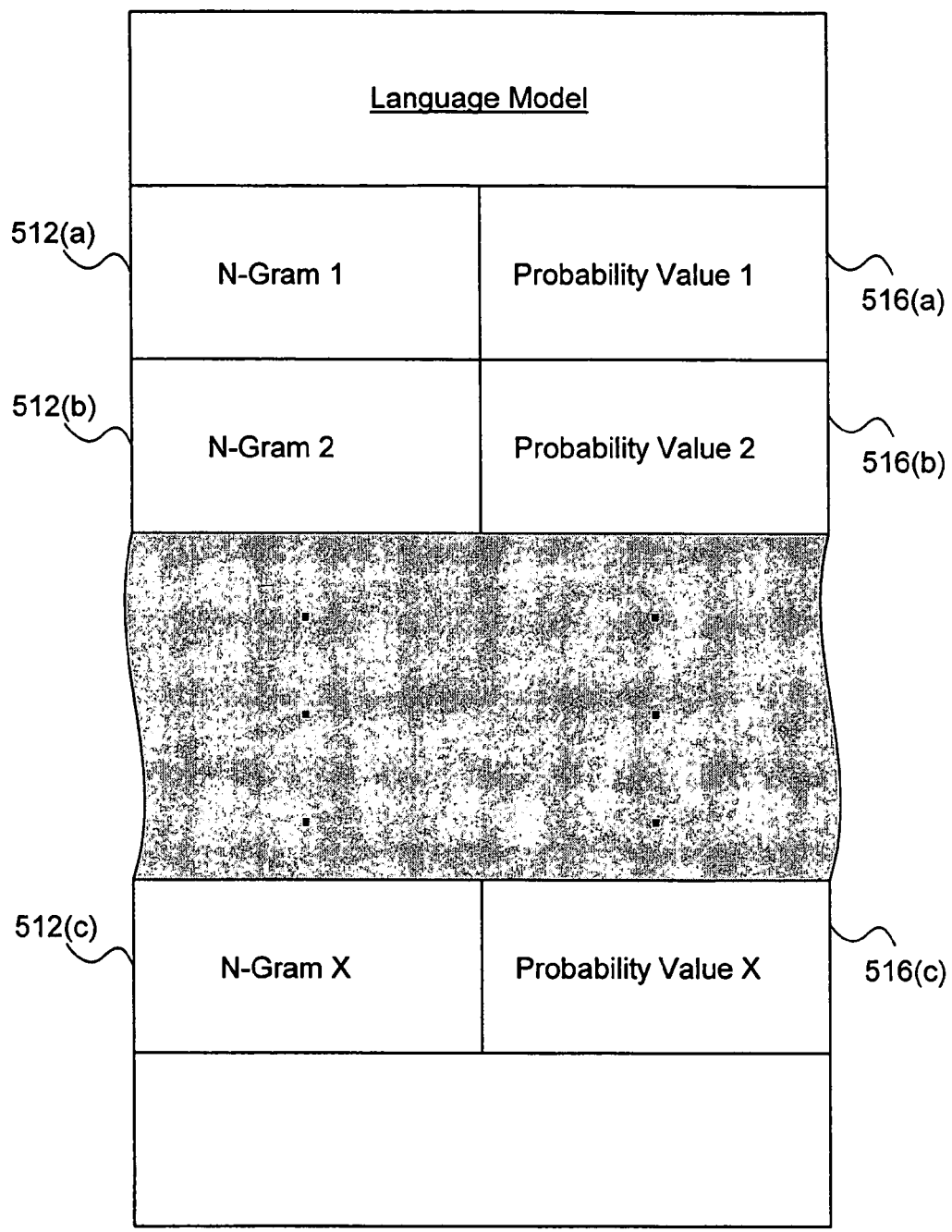
FIG. 5 is a block diagram for one embodiment of the language model of FIG. 2, in accordance with the present invention.

Referring now to FIG. 5, a block diagram for one embodiment of the FIG. 2 language model 218 is shown, in accordance with the present invention. In alternate embodiments, language model 218 may readily include various other elements or functionalities in addition to, or instead of, those elements or functionalities discussed in conjunction with the FIG. 5 embodiment.

In the FIG. 5 embodiment, language model 218 includes an N-gram 1 (512(a)) through an N-gram X (512(c)). Language model 218 may be implemented to include any desired number of N-grams 512 that may include any desired type of information. In the FIG. 5 embodiment, each N-gram 512 from language model 218 typically includes a series of "N" vocabulary words from dictionary 340. For example, a trigram is an N-gram 512 of three vocabulary words from dictionary 340.

In the FIG. 5 embodiment, language model 218 is implemented as a statistical language model in which each N-gram 512 is associated with a corresponding probability value 516. For example, N-gram 1 (512(a)) corresponds to probability value 1 (516(a)), N-gram 2 (512(b)) corresponds to probability value 2 (516(b)), and N-gram X (512(c)) corresponds to probability value X (516(c)). Each probability value 516 expresses the statistical probability of the final vocabulary word in the corresponding N-gram 512 in light of the preceding vocabulary words in that same N-gram 512. Recognizer 314 may thus refer to appropriate probability values 516 to improve the likelihood of correctly recognizing similar word sequences during speech recognition procedures.

Figure 6:
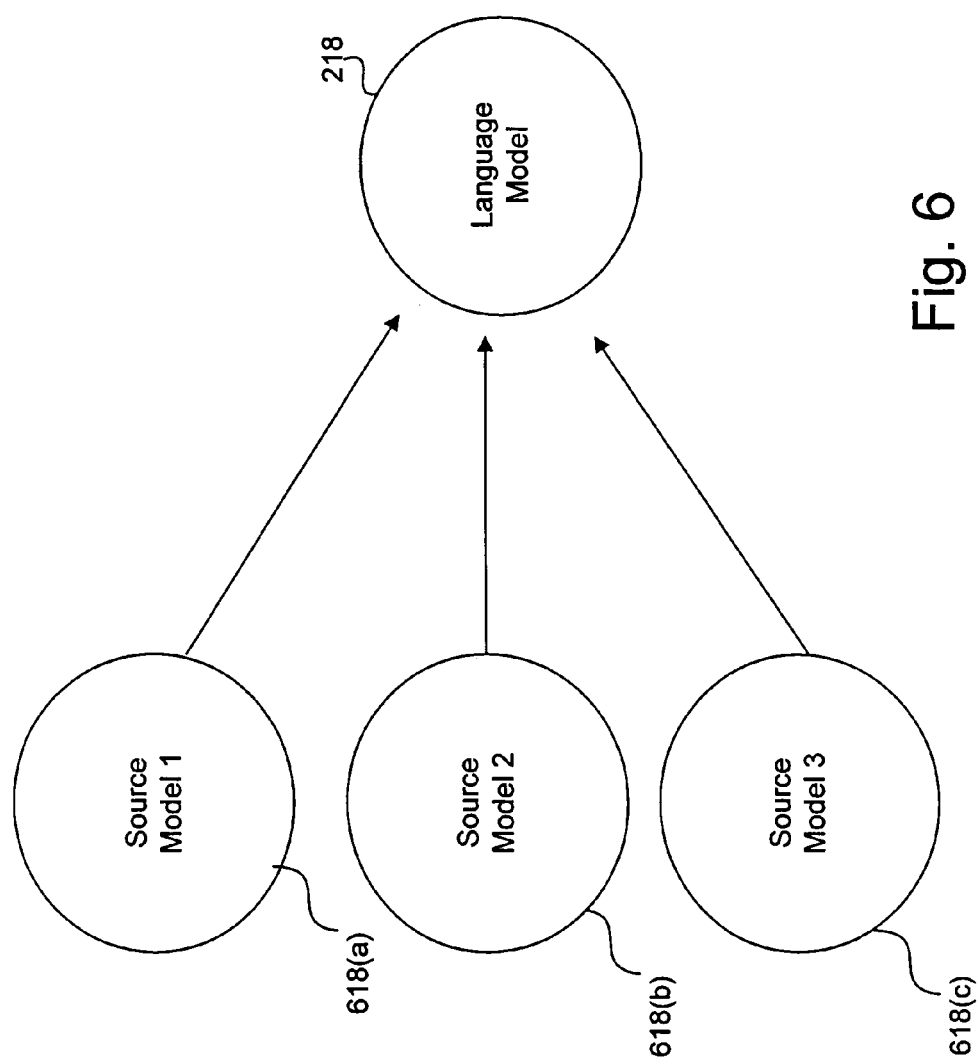
FIG. 6 is a diagram illustrating an exemplary interpolation procedure, in accordance with one embodiment of the present invention.

Referring now to FIG. 6, a diagram illustrating an exemplary interpolation procedure 610 is shown, in accordance with one embodiment of the present invention. The FIG. 6 embodiment is presented for purposes of illustration, and in alternate embodiments, the present invention may perform interpolation procedures using various techniques or functionalities in addition to, or instead of, those techniques or functionalities discussed in conjunction with the FIG. 6 embodiment.

In the FIG. 6 embodiment, language model 218 is implemented by performing interpolation procedure 610 to combine information from several source models 618. For purposes of illustration, the FIG. 6 interpolation procedure 610 is discussed in the context of combining three source models (source model 1 (618(a)), source model 2 (618(b)), and source model 3 (618(c))). However in various other embodiments, any desired number of source models 618 may be combined to produce language model 218.

In the FIG. 6 embodiment, source models 618 are each implemented according to a same or similar configuration as that discussed above in conjunction with the FIG. 5 language model 218. Source models 618 therefore each may include a series of N-grams 512 and corresponding probability values 516. In the FIG. 6 embodiment, source models 618 and language model 218 each may include the same or a similar series of N-grams 512. However the corresponding probability values 516 for each source model 618 are typically different because each source model 618 corresponds to a different domain or application. For example, in certain embodiments, source models 618 may alternately correspond to a news domain, an Internet domain, a financial information domain, or a spontaneous speech domain.

In the FIG. 6 embodiment, source models 618 may be combined to produce language model 218 according to the following formula:

$$LM = \lambda_1 SM_1 + \lambda_2 SM_2 + \ldots + \lambda_n SM_n$$

where the LM value is language model 218, the $SM_1$ value is a first source model 618, the $SM_n$ value is a final source model 618 in a continuous sequence of "n" source models 618, and the $\lambda$ (lambda) values are interpolation coefficients that are applied to the respective probability values 516 of source models 618 to weight how much each of the source models 618 influence the combined language model 218. In the FIG. 6 example, the lambda ($\lambda$) values/interpolation coefficients are each greater than or equal to "0", and are also less than or equal to "1". In addition, the sum of all lambda ($\lambda$) values/interpolation coefficients is equal to "1".

In the FIG. 6 embodiment, in order to effectively implement language model 218 in an optimized manner, the foregoing interpolation coefficients are selectively chosen by analyzing the effect of various combinations of the interpolation coefficients upon a word-error rate (WER) corresponding to recognition accuracy of speech recognizer 314 (FIG. 3). Identifying interpolation coefficients that produce the best word-error rate for recognizer 314 may be achieved in any effective manner. For example, empirically testing a series of coefficient combinations to determine which produces the best word-error rate is one acceptable method. Alternately, an intelligent expectation maximization procedure may also be efficiently utilized to select the interpolation coefficients. One embodiment for performing interpolation procedure 610 is further discussed above in conjunction with FIG. 8.

Figure 7:
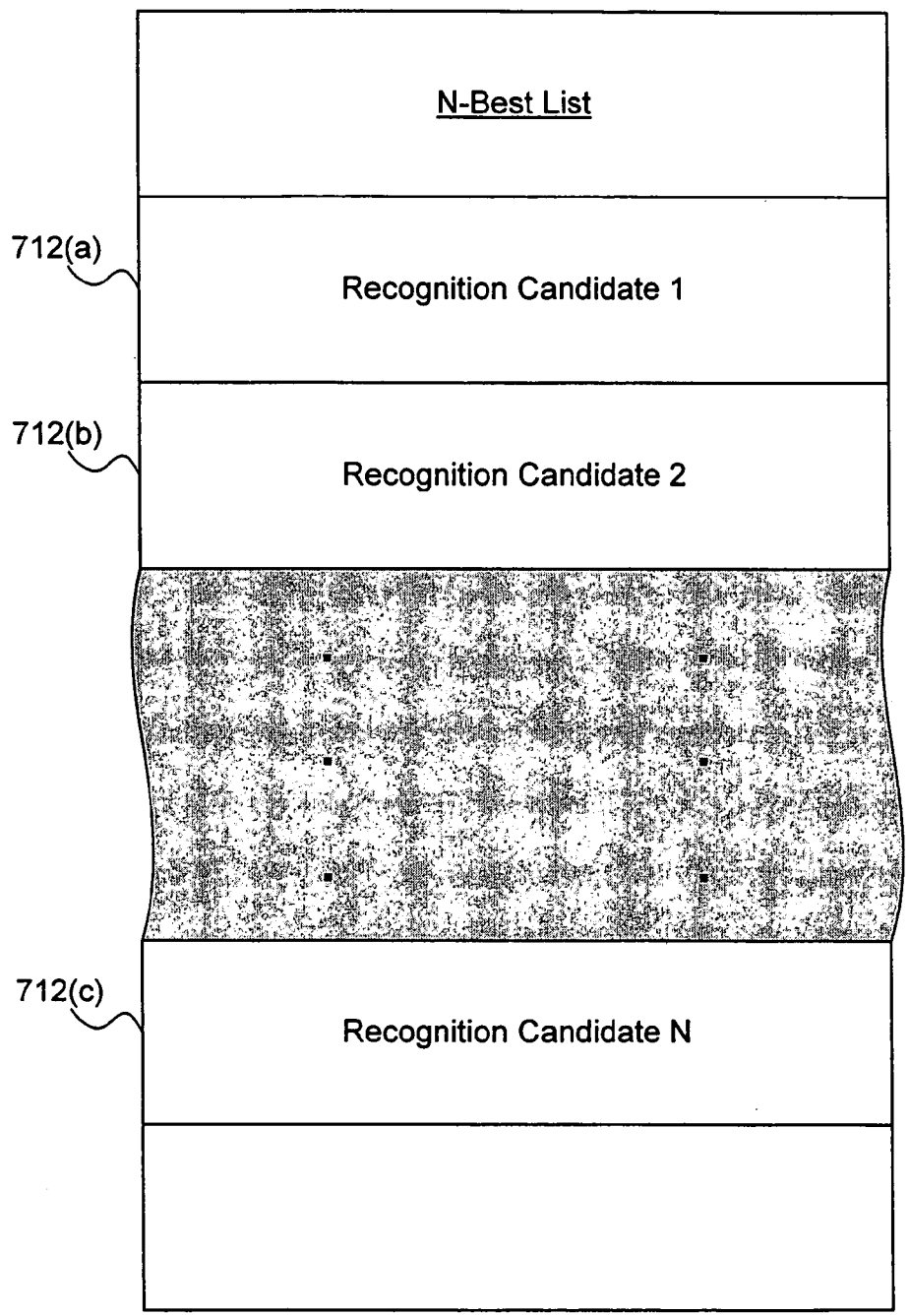
FIG. 7 is a block diagram for one embodiment of an N-best list, in accordance with the present invention.

Referring now to FIG. 7, a block diagram of an N-best list 710 is shown, in accordance with one embodiment of the present invention. In the FIG. 7 embodiment, N-best list 710 may include a recognition candidate 1 (712(a)) through a recognition candidate N (712(c)). In alternate embodiments, N-best list 710 may readily include various other elements or functionalities in addition to, or instead of, those elements or functionalities discussed in conjunction with the FIG. 7 embodiment.

In the FIG. 7 embodiment, N-best list 710 may readily be implemented to include any desired number of recognition candidates 712 that may include any desired type of information. In the FIG. 7 embodiment, each recognition candidate 712 includes a recognition result in text format, and a corresponding recognition score. The foregoing recognition result and recognition score may be generated from recognizer 314 (FIG. 3) by operating upon pre-defined development data (such as a series of word sequences, phrases, or sentences). In the FIG. 7 embodiment, recognition candidates 712 of N-best list 710 are preferably sorted and ranked by their recognition score, with recognition candidate 1 (712(a)) having the highest or best recognition score, and recognition candidate N (712(c)) have the lowest or worst recognition score.

In the FIG. 7 embodiment, as discussed above in conjunction with FIG. 6, a word-error rate for recognizer 314 may be utilized to select interpolation coefficients for optimizing language model 218. In certain embodiments, recognizer 314 or a separate rescoring module iteratively utilizes various proposed initial language models 218 corresponding to respective set of interpolation coefficients to repeatedly rescore recognition candidates 712 from N-best list 710 by inputting and processing the foregoing pre-defined development data. To determine a word-error rate corresponding to a given proposed language model 218, a top recognition candidate 712 (such as candidate 1 (712(a)) of FIG. 7) having the highest or best recognition score, is compared to a known correct transcription of the corresponding pre-defined development data.

In the FIG. 7 embodiment, a word-error rate may be calculated to include one or more substitutions in which an incorrect word has been substituted for a correct word in the top recognition candidate 712. The word-error rate may also include one or more deletions in which a correct word has been deleted from the top recognition candidate 712. In addition, the word-error rate may include one or more insertions in which an incorrect word has been inserted into the top recognition candidate 712.

Therefore, in certain embodiments, after comparing the foregoing known correct transcription of pre-defined development data with the top recognition candidate 712 from N-best list 710, a word-error rate for evaluating interpolation coefficients corresponding to a proposed language model 218 may be calculated according to the following formula:

WER=(Subs+Deletes+Inserts)/Total Words in Correct Transcription where WER is the word-error rate for a given proposed language model 218, Subs are substitutions in a top recognition candidate 712 from N-best list 710, Deletes are deletions in a top recognition candidate 712 from N-best list 710, Inserts are insertions in a top recognition candidate 712 from N-best list 710, and Total Words in Correct Transcription are a total number of words in the known correct transcription of pre-defined input development data. One embodiment for the utilization of N-best list 710 is further discussed below in conjunction with FIG. 8.

Figure 8:
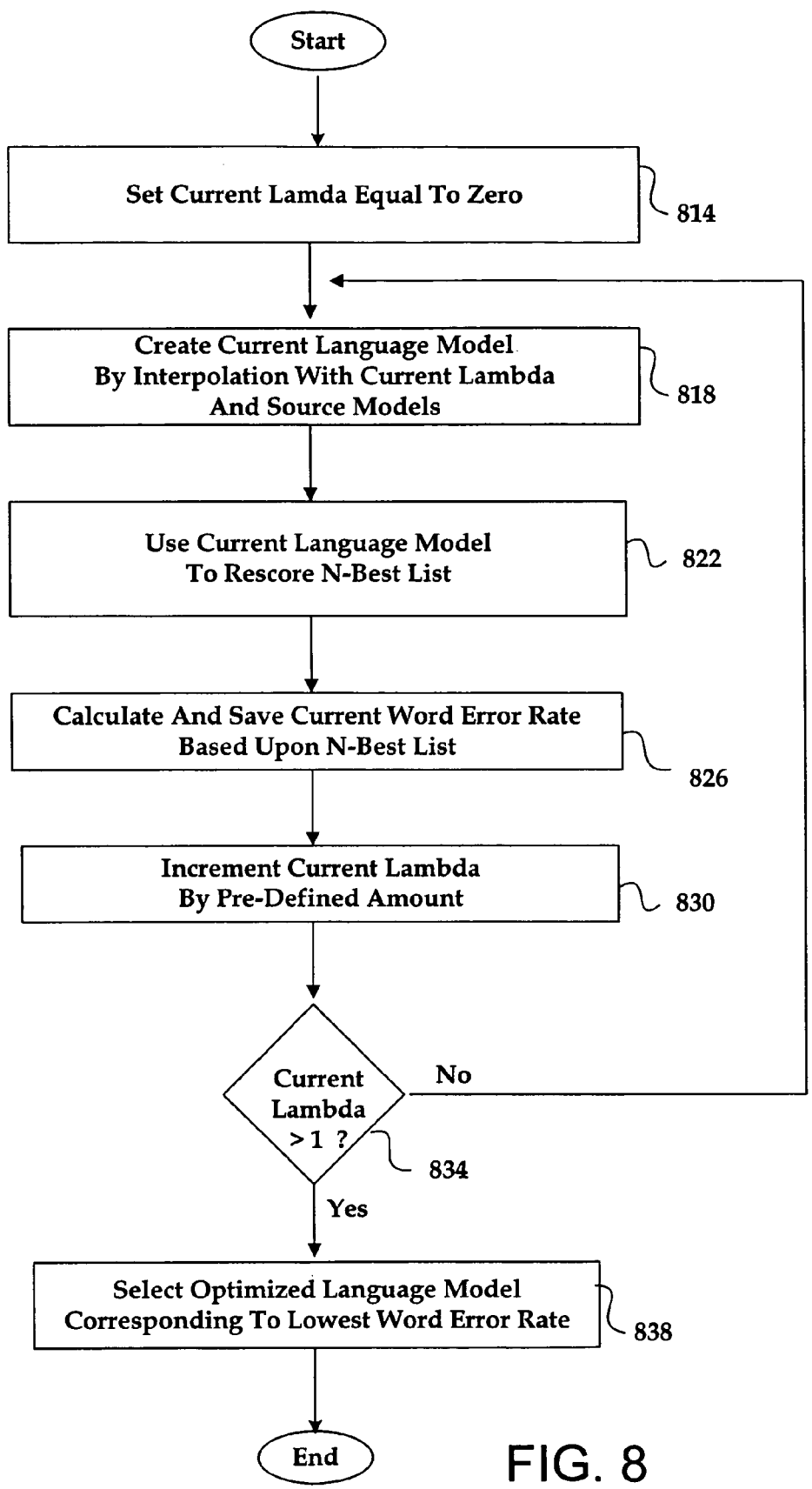
FIG. 8 is a flowchart of method steps for effectively implementing an optimized language model, in accordance with one embodiment of the present invention.

Referring now to FIG. 8, a flowchart of method steps for effectively implementing an optimized language model is shown, in accordance with one embodiment of the present invention. The FIG. 8 embodiment is discussed in the context of combining two source models 618 to produce an optimized language model 218. However, in alternate embodiments, the present invention may similarly be practiced with any desired number of source models 618. Furthermore, the FIG. 8 flowchart is presented for purposes of illustration, and in alternate embodiments, the present invention may readily utilize various steps and sequences other than those discussed in conjunction with the FIG. 8 embodiment.

In the FIG. 8 embodiment, in step 814, a current lambda value is initially set equal to zero. Then, in step 818, a current language model 218 is created by performing an interpolation procedure with the current lambda value and selected source models 618.

In certain embodiments, current language model 218 may be created according to the following formula:

$$LM = \lambda SM_1 + (1-\lambda) SM_2$$

where the LM value is current language model 218, the $SM_1$ value is a first source model 618, the $SM_2$ value is a second source model 618, the $\lambda$ value is a first interpolation coefficient, and the $(1-\lambda)$ value is a second interpolation coefficient.

In step 822, a recognizer 314 or a separate rescoring module rescores an N-best list 710 of recognition candidates 712 after utilizing the current language model 218 to perform a recognition procedure upon pre-defined development data corresponding to the N-best list 710. In step 826, a word-error rate corresponding to the current language model 218 is calculated and stored based upon a comparison between a known correct transcription of the pre-defined development data and a top recognition candidate 712 from N-best list 710.

In step 830, the current lambda is incremented by a pre-defined amount to produce a new current lambda. Then, in step 834, if the new current lambda is not greater than one, the FIG. 8 process returns to step 818 to iteratively generate a new current language model 218, rescore N-best list 710, and calculate a new current word-error rate corresponding to the new current language model 218. However, in step 834, if the new current lambda is greater than one, then an optimized language model 218 is selected corresponding to the lowest/best word-error rate from the foregoing iterative optimization procedure. In accordance with the present invention, recognizer 314 may then effectively utilize optimized language model 218 for accurately performing various speech recognition procedures. The present invention thus provides an improved system and method for effectively implementing a language model for speech recognition The invention has been explained above with reference to certain preferred embodiments. Other embodiments will be apparent to those skilled in the art in light of this disclosure. For example, the present invention may readily be implemented using configurations and techniques other than those described in the embodiments above. Additionally, the present invention may effectively be used in conjunction with systems other than those described above as the preferred embodiments. Therefore, these and other variations upon the foregoing embodiments are intended to be covered by the present invention, which is limited only by the appended claims.

What is claimed is:

1. A system for optimizing speech recognition procedures, comprising:
   initial language models each iteratively created by combining source models according to interpolation coefficients that define proportional relationships for combining said source models;
   a speech recognizer that utilizes said initial language models to iteratively process input development data in corresponding ones of said speech recognition procedures for calculating word-error rates that each correspond to a different one of said initial language models; and
   an optimized language model selected from said initial language models by identifying an optimal word-error rate from among said word-error rates, said speech recognizer utilizing said optimized language model for performing subsequent ones of said speech recognition procedures.

2. The system of claim 1 wherein said word-error rates are calculated by comparing a correct transcription of said input development data and a top recognition candidate from an N-best list that is rescored by a rescoring module for each of said initial language models.

3. The system of claim 1 wherein said initial language models are implemented as statistical language models that include N-grams and probability values that each correspond to one of said N-grams.

4. The system of claim 1 wherein said input development data includes a pre-defined series of spoken word sequences from which said recognizer rescores a corresponding N-best list for calculating said word-error rates.

5. The system of claim 1 wherein said source models are each similarly implemented as statistical language models that include N-grams and probability values that each correspond to one of said N-grams, each of said N-grams being the same in all of said source models.

6. The system of claim 1 wherein each of said source models corresponds to a different application domain that is related to a particular speech environment.

7. The system of claim 1 wherein sets of said interpolation coefficients are each associated with a different one of said source models to define how much said different one of said source models contributes to a corresponding one of said initial language models.

8. The system of claim 1 wherein said interpolation coefficients are each multiplied with a different one of said source models to produce a series of weighted source models that are then combined to produce a corresponding one of said initial language models.

9. The system of claim 1 wherein said initial language models are each calculated by a formula:

$$LM=\lambda_1 SM_1+\lambda_2 SM_2+\ldots+\lambda_n SM_n$$

where said LM is one of said initial language models, said $SM_1$ is a first one of said source models, said $SM_n$ is a final one of said source models in a continuous sequence of "n" source models, and said $\lambda_1$, said $\lambda_2$, and said $\lambda_n$ are said interpolation coefficients applied to respective probability values of said source models to weight how much each of said source models contributes to said one of said initial language models.

10. The system of claim 1 wherein said interpolation coefficients are each greater than or equal to "0", and are also each less than or equal to "1", a sum of all of said interpolation coefficients being equal to "1".

11. The system of claim 1 wherein said interpolation coefficients for creating said optimized language model are selectively chosen by analyzing effects of various combinations of said interpolation coefficients upon said word-error rates that correspond to recognition accuracy characteristics of said speech recognizer, said optimized language model being directly implemented by minimizing said optimal word-error rate through a selection of said interpolation coefficients.

12. The system of claim 1 wherein a rescoring module repeatedly processes said input development data to rescore an N-best list of recognition candidates for calculating said word-error rates by comparing a top recognition candidate to said input development data, said recognition candidates each including a recognition result in a text format, and a corresponding recognition score.

13. The system of claim 1 wherein each of said word-error rates are calculated by comparing a correct transcription of said input development data and a top recognition candidate from an N-best list of recognition candidates provided by said speech recognizer after processing said input development data, said top recognition candidate corresponding to a best recognition score from said speech recognizer.

14. The system of claim 1 wherein said word-error rates are calculated to include one or more substitutions in which a first incorrect word has been substituted for a first correct word in a recognition result, said word-error rates also including one or more deletions in which a second correct word has been deleted from said recognition result, said word-error rates further including one or more insertions in which a second incorrect word has been inserted into said recognition result.

15. The system of claim 1 wherein said word-error rates are each calculated according to a formula:

WER=(Subs+Deletes+Inserts)/Total Words in Correct Transcription where said WER is one of said word-error rates corresponding to one of said initial language models, said Subs are substitutions in a recognition result, said Deletes are deletions in said recognition result, said Inserts are insertions in said recognition result, and said Total Words in Correct Transcription is a total number of words in a correct transcription of said input development data.

16. The system of claim 1 wherein an interpolation procedure for combining said source models into one of said initial language models is performed by utilizing a selected initial set of said interpolation coefficients.

17. The system of claim 16 wherein a rescoring module rescores an N-best list of recognition candidates after utilizing said one of said initial language models to perform a recognition procedure upon said input development data.

18. The system of claim 17 wherein one of said word-error rates corresponding to said one of said initial language models is calculated and stored based upon a comparison between a correct transcription of said input development data and a top recognition candidate from said N-best list.

19. The system of claim 18 wherein said selected initial set of said interpolation coefficients are each iteratively altered by a pre-defined amount to produce subsequent sets of said interpolation coefficients.

20. The system of claim 19 wherein subsequent initial language models are created by utilizing said subsequent sets of interpolation coefficients, a rescoring module iteratively utilizing said subsequent initial language models to rescore said N-best list for calculating subsequent word-error rates, said optimized language model being selected by identifying said optimal word-error rate when a pre-determined number of said subsequent word-error rates have been calculated.

21. A method for optimizing speech recognition procedures, comprising:
creating initial language models by iteratively combining source models according to interpolation coefficients that define proportional relationships for combining said source models;
utilizing said initial language models to iteratively process input development data in corresponding ones of said speech recognition procedures for calculating word-error rates that each correspond to a different one of said initial language models;
selecting an optimized language model from said initial language models by identifying an optimal word-error rate from among said word-error rates; and
utilizing said optimized language model for performing subsequent ones of said speech recognition procedures with a speech recognizer.

22. The method of claim 21 wherein said word-error rates are calculated by comparing a correct transcription of said input development data and a top recognition candidate from an N-best list that is rescored by a rescoring module for each of said initial language models.

23. The method of claim 21 wherein said initial language models are implemented as statistical language models that include N-grams and probability values that each correspond to one of said N-grams.

24. The method of claim 21 wherein said input development data includes a pre-defined series of spoken word sequences from which said recognizer rescores a corresponding N-best list for calculating said word-error rates.

25. The method of claim 21 wherein said source models are each similarly implemented as statistical language models that include N-grams and probability values that each correspond to one of said N-grams, each of said N-grams being the same in all of said source models.

26. The method of claim 21 wherein each of said source models corresponds to a different application domain that is related to a particular speech environment.

27. The method of claim 21 wherein sets of said interpolation coefficients are each associated with a different one of said source models to define how much said different one of said source models contributes to a corresponding one of said initial language models.

28. The method of claim 21 wherein said interpolation coefficients are each multiplied with a different one of said source models to produce a series of weighted source models that are then combined to produce a corresponding one of said initial language models.

29. The method of claim 21 wherein said initial language models are each calculated by a formula:

$$LM = \lambda_1 SM_1 + \lambda_2 SM_2 + \ldots + \lambda_n SM_n$$

where said LM is one of said initial language models, said $SM_1$ is a first one of said source models, said $SM_n$ is a final one of said source models in a continuous sequence of "n" source models, and said $\lambda_1$, said $\lambda_2$, and said $\lambda_n$ are said interpolation coefficients applied to respective probability values of said source models to weight how much each of said source models contributes to said one of said initial language models.

30. The method of claim 21 wherein said interpolation coefficients are each greater than or equal to "0", and are also each less than or equal to "1", a sum of all of said interpolation coefficients being equal to "1".

31. The method of claim 21 wherein said interpolation coefficients for creating said optimized language model are selectively chosen by analyzing effects of various combinations of said interpolation coefficients upon said word-error rates that correspond to recognition accuracy characteristics of said speech recognizer, said optimized language model being directly implemented by minimizing said optimal word-error rate through a selection of said interpolation coefficients.

32. The method of claim 21 wherein a rescoring module repeatedly processes said input development data to generate and rescore an N-best list of recognition candidates for calculating said word-error rates by comparing a top recognition candidate to said input development data, said recognition candidates each including a recognition result in a text format, and a corresponding recognition score.

33. The method of claim 21 wherein each of said word-error rates are calculated by comparing a correct transcription of said input development data and a top recognition candidate from an N-best list of recognition candidates provided by said speech recognizer after processing said input development data, said top recognition candidate corresponding to a best recognition score from said speech recognizer.

34. The method of claim 21 wherein said word-error rates are calculated to include one or more substitutions in which a first incorrect word has been substituted for a first correct word in a recognition result, said word-error rates also including one or more deletions in which a second correct word has been deleted from said recognition result, said word-error rates further including one or more insertions in which a second incorrect word has been inserted into said recognition result.

35. The method of claim 21 wherein said word-error rates are each calculated according to a formula:

$$WER = (Subs + Deletes + Inserts)/\text{Total Words in Correct Transcription}$$

where said WER is one of said word-error rates corresponding to one of said initial language models, said Subs are substitutions in a recognition result, said Deletes are deletions in said recognition result, said Inserts are insertions in said recognition result, and said Total Words in Correct Transcription is a total number of words in a correct transcription of said input development data.

36. The method of claim 21 wherein an interpolation procedure for combining said source models into one of said initial language models is performed by utilizing a selected initial set of said interpolation coefficients.

37. The method of claim 36 wherein a rescoring module rescores an N-best list of recognition candidates after utilizing said one of said initial language models to perform a recognition procedure upon said input development data.

38. The method of claim 37 wherein one of said word-error rates corresponding to said one of said initial language models is calculated and stored based upon a comparison between a correct transcription of said input development data and a top recognition candidate from said N-best list.

39. The method of claim 38 wherein said selected initial set of said interpolation coefficients are each iteratively altered by a pre-defined amount to produce subsequent sets of said interpolation coefficients.

40. The method of claim 39 wherein subsequent initial language models are created by utilizing said subsequent sets of interpolation coefficients, a rescoring module iteratively utilizing said subsequent initial language models to rescore said N-best list for calculating subsequent word-error rates, said optimized language model being selected by identifying said optimal word-error rate when a pre-determined number of said subsequent word-error rates have been calculated.

41. A system for optimizing speech recognition procedures, comprising:

means for creating initial language models by iteratively combining source models according to interpolation coefficients that define proportional relationships for combining said source models;

means for utilizing said initial language models to iteratively process input development data in corresponding ones of said speech recognition procedures for calculating word-error rates that each correspond to a different one of said initial language models;

means for selecting an optimized language model from said initial language models by identifying an optimal word-error rate from among said word-error rates; and means for utilizing said optimized language model for performing subsequent ones of said speech recognition procedures.

42. A system for optimizing speech recognition procedures, comprising:

initial language models each iteratively created by combining source models according to interpolation coefficients that define proportional relationships for combining said source models;

a speech recognizer that utilizes said initial language models to iteratively process input development data in corresponding ones of said speech recognition procedures for calculating word-error rates that each correspond to a different one of said initial language models, said word-error rates being calculated by comparing a correct transcription of said input development data and a top recognition candidate from an N-best list that is rescored by a rescoring module for each of said initial language models; and an optimized language model selected from said initial language models by identifying an optimal word-error rate from among said word-error rates, said speech recognizer utilizing said optimized language model for performing subsequent ones of said speech recognition procedures.

43. The method of claim 26 wherein said different application domain alternately includes any of a news domain, an Internet domain, a financial information domain, and a spontaneous speech domain.

44. The method of claim 21 wherein said source models may include any number of different individual language models.

45. The method of claim 21 wherein said source models are implemented as finalized language models that are individually capable of being separately utilized for performing said speech recognition procedures before being combined to produce said initial language models.

* * * * *